(12) United States Patent
Kwan et al.

(10) Patent No.: US 10,983,850 B1
(45) Date of Patent: Apr. 20, 2021

(54) REAL-TIME APPLICATION PROGRAMMING INTERFACE ANOMALY DETECTION AND MITIGATION

(71) Applicant: Amazon Technologies, Inc., Seattle, WA (US)

(72) Inventors: Yuk Lun Patrick Kwan, Bellevue, WA (US); Revanth Pathuri, Redmond, WA (US); Carl Eubanks Olson, Seattle, WA (US); Gary Rittinger, Kent, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/825,839

(22) Filed: Mar. 20, 2020

(51) Int. Cl.
*G06F 9/54* (2006.01)
*G06F 11/07* (2006.01)

(52) U.S. Cl.
CPC .......... *G06F 9/547* (2013.01); *G06F 11/0709* (2013.01); *G06F 11/0793* (2013.01)

(58) Field of Classification Search
CPC ................................. G06F 9/541; G06F 9/542
USPC .................................................. 719/318, 328
See application file for complete search history.

(56) References Cited

U.S. PATENT DOCUMENTS

| | | | | |
|---|---|---|---|---|
| 10,642,719 | B1* | 5/2020 | Balasubramanian | ........................ G06F 11/3055 |
| 10,644,962 | B2* | 5/2020 | O'Neill | ................... G06F 9/541 |
| 2013/0104150 | A1* | 4/2013 | Rdzak | ....................... G06F 9/54 719/328 |
| 2020/0133744 | A1* | 4/2020 | MacLeod | .................. G06F 9/54 |

* cited by examiner

*Primary Examiner* — Andy Ho
(74) *Attorney, Agent, or Firm* — Eversheds Sutherland (US) LLP

(57) ABSTRACT

Devices, systems, and methods are provided for detecting and mitigating application programming interface (API) anomalies. A method may include identifying, based on a first data log, first API data associated with a first API call and a first computer service, and identifying an agreement associated with the first computer service, the agreement including criteria associated with the first API data. The method may include determining that the first API data fails to satisfy the criteria. The method may include determining one or more service dependencies, the one or more service dependencies indicating that operation of the first service depends on operation of a second computer service. The method may include determining, based on the one or more service dependencies, one or more services to which to send notifications indicative of the criteria. The method may include sending the notifications to the one or more services.

20 Claims, 6 Drawing Sheets

US 10,983,850 B1

REAL-TIME APPLICATION PROGRAMMING INTERFACE ANOMALY DETECTION AND MITIGATION

BACKGROUND

Computer users increasingly are using computer applications whose execution depends on other computer applications. When one computer service calls another computer service whose execution depends on the execution of one or more other computer services, and when the response to the call results in a network error or data corruption, the computer service that performed the call may detect or be informed of an error, but may not be able to notify the computer service call responder of the error and whether the error was caused by the computer service call responder or another computer service on which the computer service call responder depends. Therefore, there is a need for detecting errors caused by dependency computer services and notifying computer services of the error and the dependency computer service responsible for the error.

Figure 1:
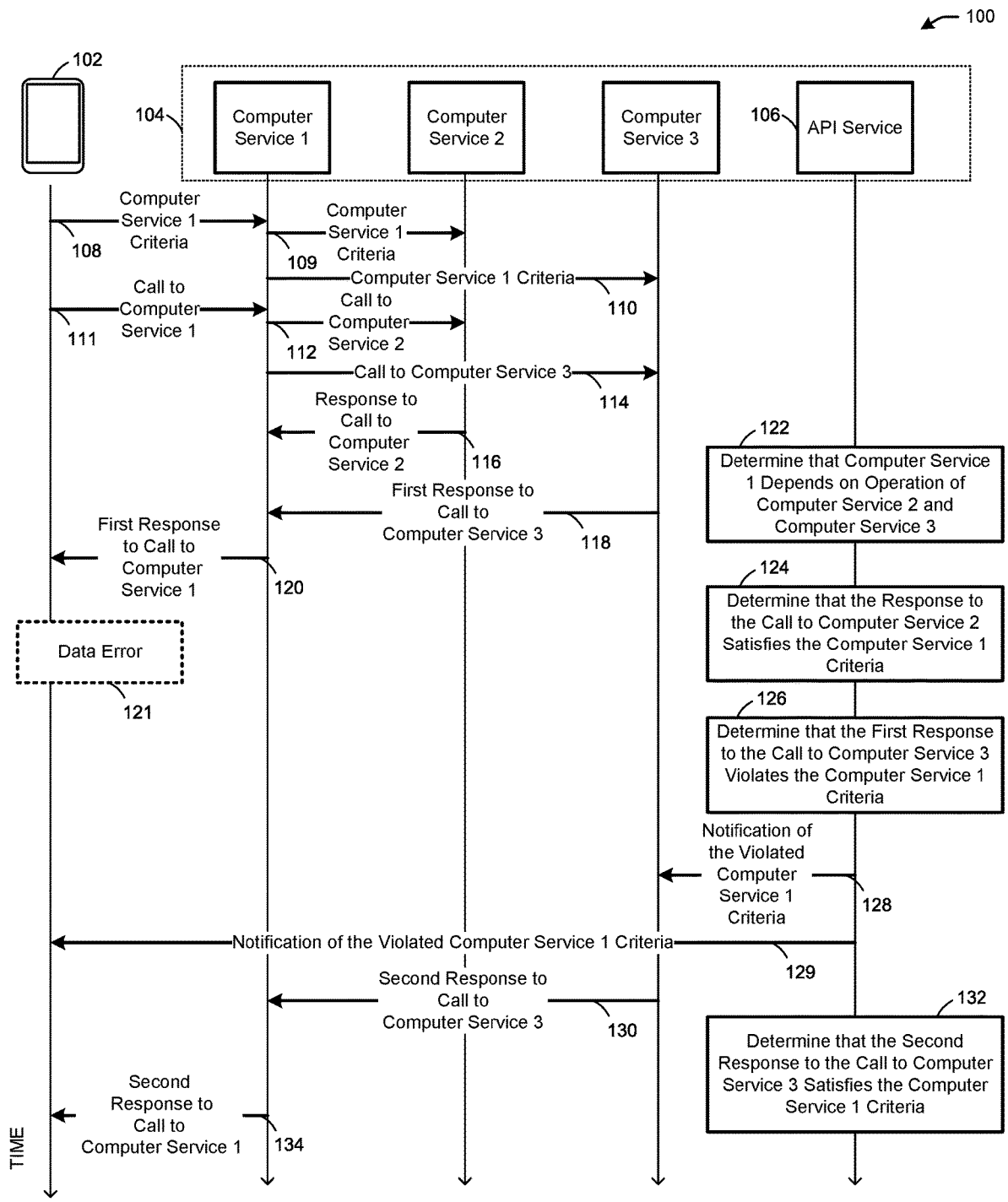
FIG. 1 illustrates an example process for detecting and mitigating application programming interface (API) anomalies, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for detecting and mitigating application programming interface (API) anomalies.

The operation of some computer services may require the execution of other computer components. The background computer services that allow another computer service to execute may be referred to as dependency services. For example, a first service may not execute without the execution of a second service and a third service, in which case the second and third services may be dependency services of the first service (e.g., the first service depends on the execution of the second and third services). The result of an operation performed by the first service may depend on a result provided to the first service by the second service and/or a result provided to the first service by the third service. When the second or third service fails to provide data needed by the first service to perform an operation, or when the data provided to the first service by the second or third service is corrupted or in error, the first service may fail to perform an operation (e.g., to provide requested data to a device). Computer services and applications such as web browsers, messaging, media streaming, data storage and/or sharing, and the like may depend on dependency services such as active directories, domain name services, data storage services, and other services. For example, a call made by a device for webpage data to display as a webpage may result in additional calls to other services. When the additional calls do not result in the return of expected data, the webpage may not be displayed properly or at all.

The execution of a first service on a computer may depend on one or multiple dependency services, and any dependency service also may depend on one or more multiple dependency services, which also may be referred to as dependency services of the first service. Therefore, a computer service may be a dependency service of another service and may depend on other dependency services. For example, a first service may depend on a second service, and the second service may depend on a third service. The execution of the third service may allow execution of the second service, which may allow execution of the first service. Therefore, the first service is dependent on the second and third services, and the second service is dependent on the third service.

Computer network resources may include physical host computers, virtual machine instances, logic components, and the like. Computer network resources may be used to provide one or more computer services to one or more user devices. Computer services may include compute cloud services, cloud storage services, database services, workflow services, queuing services, notification/messaging services, content delivery services, and the like.

Computer services may call one another using application programming interfaces (APIs). Calls made from one API to another API may be referred to as API calls. API calls allow computer services to communicate with one another. For example, an API call from one computer service (e.g., an endpoint) may be referred to as the requesting computer service. The API call may request something from another computer service (e.g., another endpoint). For example, the requested (e.g., called) endpoint may be defined by a uniform resource location (URL) included in the API call. The API call may request information to be returned to the requesting endpoint, information to be posted by or at the requested endpoint, information to be modified or deleted by or at the requested endpoint, and the like.

When a first computer service calls a second computer service, the first computer service may expect certain information in response based on the request. An API call may result in a response, which may include the correct data or incorrect data (e.g., corrupted data), or may result in 5xx errors, a "resource not found" error, library exceptions, or other types of errors that result in failure to accomplish a goal of an API call (e.g., failure to implement the request of an API call).

Computer services with API call capabilities may maintain API logs or other service logs (e.g., data logs) that store information documenting API requests and responses, such as the time of any API calls (e.g., requests and responses), the path of any API calls, the status of any API calls, the information included in the API calls (e.g., the payload or body), and the like. Computer services may monitor API logs to identify errors and data corruption based on the contents of any API calls. However, when a computer service identifies an error or data corruption for an API call, the log information may indicate the requesting service and the responding service, so the computer service may not be able to determine whether the reason for the error or the data corruption was caused by the requesting service or on a dependency service of the requesting service.

Some processes used to identify errors and data corruption associated with API calls between computer services may require significant human resources to analyze service logs, issue service tickets to indicate the errors and corruption, and to debug the errors and corruption. Not only is the use of many human operators inefficient in some situations, but the errors and corruption may not be noticed until later after problems may occur, such as the use of corrupted data.

Therefore, computer services and computer service users may benefit from real-time detection of API anomalies and the dependency services associated with the API anomalies.

In one or more embodiments, an API notification service may provide configurable service level agreements (SLAs) to computer services. The SLAs may define configurable criteria for dependency services (e.g., dependency APIs), such as acceptable data types, data ranges, data sources used to respond to an API call, and the like. For example, a configurable SLA may define the criteria for a string of characters used in an API response, allowing the API notification service to determine (e.g., based on service log information) whether an API response included a string of characters that complied with the criteria defined by the SLA. When the criteria is not satisfied, the API notification service may send one or more notification messages to a computer service (e.g., to the service that was the source of the non-compliance).

In one or more embodiments, because an SLA may define the dependency services of one or more computer services, the API notification service may use the SLA to determine the dependencies (e.g., relationships) between multiple computer services. For example, the API notification service may determine a dependency tree that indicates the one or more dependency services of one or more additional services. The API notification service may monitor service logs, identify errors and corruption based on the criteria defined by SLAs, may identify a responding service, and may use the dependency tree (or other mapping) to determine which, if any, dependency service may have caused the error or corruption. For example, the API notification service may identify an error or corruption (e.g., that information in an API call does not satisfy criteria defined by an SLA), may identify the responder (e.g., the API endpoint that provided the non-compliant information), may determine one or more dependency services of the responder, and may use the logs of the responder to determine whether the error or corruption occurred based on another API call exchange with a dependency service. The API notification service may search service logs of dependency services until the API notification service identifies the source of the error or corruption based on which responding computer service provided the data that violated an SLA.

In one or more embodiments, the API notification service may generate table entries indicating errors and corruption detected, at what time, with which computer service(s), and the like. The API notification service may detect SLA violations in real-time, and may notify API service owners (e.g., the source of the SLA violation) that the API service owner issued a non-compliant response to an API call. The notification may identify the API call, the SLA, the SLA criteria not satisfied, and the like. The information provided in the notifications may allow an API service owner to rectify errors (e.g., by sending compliant information to requesting services, by notifying requesting services of the errors, etc.) in real-time to avoid subsequent errors or corruption caused by failures to comply with SLAs.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 for detecting and mitigating API anomalies, in accordance with one or more example embodiments of the present disclosure.

Referring to FIG. 1, the process 100 may include a device 102 using one or more computer-based services (e.g., computer service 1, computer service 2, computer service 3, etc.) hosted by a cloud-based network 104. The one or more computer-based services may provide web-based services (e.g., hypertext transfer protocol data for webpages, etc.), serverless computing resources, elastic computing resources, data routing resources, data storage resources, and the like. The one or more computer-based services may depend on other computer-based services (e.g., dependency services). For example, operation of the computer service 1 may depend on operation of the computer service 2 and/or operation of the computer service 3. In particular, function of the computer service 1 may depend on data retrieved, provided, edited, routed, and/or deleted by the computer service 2 and/or the computer service 3. Dependency between computer-based services may mean that a dependent service may start and stop along with the operation of the computer-based service that depends on the dependent service, and dependency may be configurable based on user selections. The cloud-based network 104 may include an API service 106 to monitor API calls made to and from the one or more computer-based services, to detect API anomalies, and to notify any devices and/or services of the anomalies, as explained further below.

Still referring to FIG. 1, at step 108, the device 102 may send to the computer service 1 criteria with which the device 102 (or a user thereof) requests compliance. For example, the criteria may be provided in the form of one or more agreements (e.g., service level agreements), and may define criteria such as data types, data length, data ranges, data sovereignty, data providence, and the like. Data provided by the service 1 to the device 102 should comply with the criteria. At step 109, the computer service 1 criteria may be provided to the computer service 2. For example, the criteria may govern data transmitted using the computer service 2. At step 110, the computer service 1 criteria may be provided to the computer service 3. For example, the criteria may govern data transmitted using the computer service 3. At step 111, the device 102 may make a call (e.g., API call) to service 1. The call may include a payload with information instructing the service 1 to perform an operation, such as to provide data to the device 102 or to provide (e.g., elsewhere) or use data included in the call. Operation of the computer service 1 may depend on operation of the computer service 2 and operation of the computer service 3. At step 112, the computer service 1 may call the computer service 2 in order to respond to the call received by the service 1 at step 111. At step 114, the computer service 1 may call the computer service 3 in order to respond to the call received by the service 1 at step 111. At step 116, the computer service 2 may provide to the computer service 1 a response to the call at step 112. At step 118, the computer service 3 may provide to the computer service 1 a response to the call at step 114 (e.g., a first response to the call at step 114). At step 120, based on the responses from the computer service 2 and the computer service 3, the computer service 1 may determine and provide to the device 102 a first response to the call at step 111. At step 121, the device may (optionally) determine or identify an error, such as a 5xx response, a HyperText Transfer Protocol (http) resource not found error, a library exception, or the like. The error may occur because the computer service 1 may have operated in error, or because the computer service 2 and/or the computer service 3 may have responded in error to the respective calls of step 112 and step 114.

Still referring to FIG. 1, the API service 106 may determine dependency data of the one or more computer services (e.g., based on data provided by the device 102, such as in the one or more agreements described above in step 108 or otherwise). In particular, the API service 106 may determine that the computer service 1 depends on operation of the computer service 2 and operation of the computer service 3. When the computer service 2 or the computer service 3 does not initiate in response to the respective calls of step 112 and step 114, or when the data provided in step 116 or step 118 to the computer service 1 does not meet the criteria provided in step 108, the failure may result in the error at step 121. A step 124, the API service 106 may determine that the response at step 116 satisfies the criteria of step 108 (e.g., by comparing the payload of an API response represented by step 116 to the criteria of step 108). At step 126, the API service 106 may determine that the response at step 118 fails to satisfy (e.g., violates) the criteria of step 108 (e.g., by comparing the payload of an API response represented by step 118 to the criteria of step 108). In response to identifying the violation and the source of the violation (e.g., computer service 3), at step 128, the API service 106 may send a notification to the computer service 3 to indicate to the computer service 3 of the violation and the criteria that was violated in step 118. Optionally, at step 129, the API service 106 may send a notification to the device 102 indicating that the violation occurred, and which criteria was violated by a computer service. At step 130, the computer service 3 may mitigate the error by sending a second response to the call of step 114, the second response including a payload that satisfies the violation noted in the notification of step 128. At step 132, the API service 106 may determine that the second response in step 130 satisfies the criteria of step 108 (e.g., by comparing the payload of the response of step 130 to the criteria). At step 134, the computer service 1 may send to the device 102 a second response to the call of step 111, thereby resulting in an acceptable response to the call of step 111 (e.g., the display of data, the receiving of data satisfying the criteria, a confirmation that one or more operations were performed in response to the call of step 111, etc.).

In one or more embodiments, the API service 106 may have access to and provide configurable service level agreements (SLAs) to the one or more computer services. The SLAs may define configurable criteria for dependency services (e.g., dependency APIs), such as acceptable data types, data ranges, data sources used to respond to an API call, and the like. For example, a configurable SLA (e.g., the criteria of step 108) may define the criteria for a string of characters used in an API response, allowing the API service 106 to determine (e.g., based on service log information) whether a payload of an API response included a string of characters that complied with the criteria defined by the SLA. When the criteria is not satisfied, the API service 106 may send one or more notification messages (e.g., step 128) to a computer service (e.g., to the service that was the source of the non-compliance).

Figure 2:
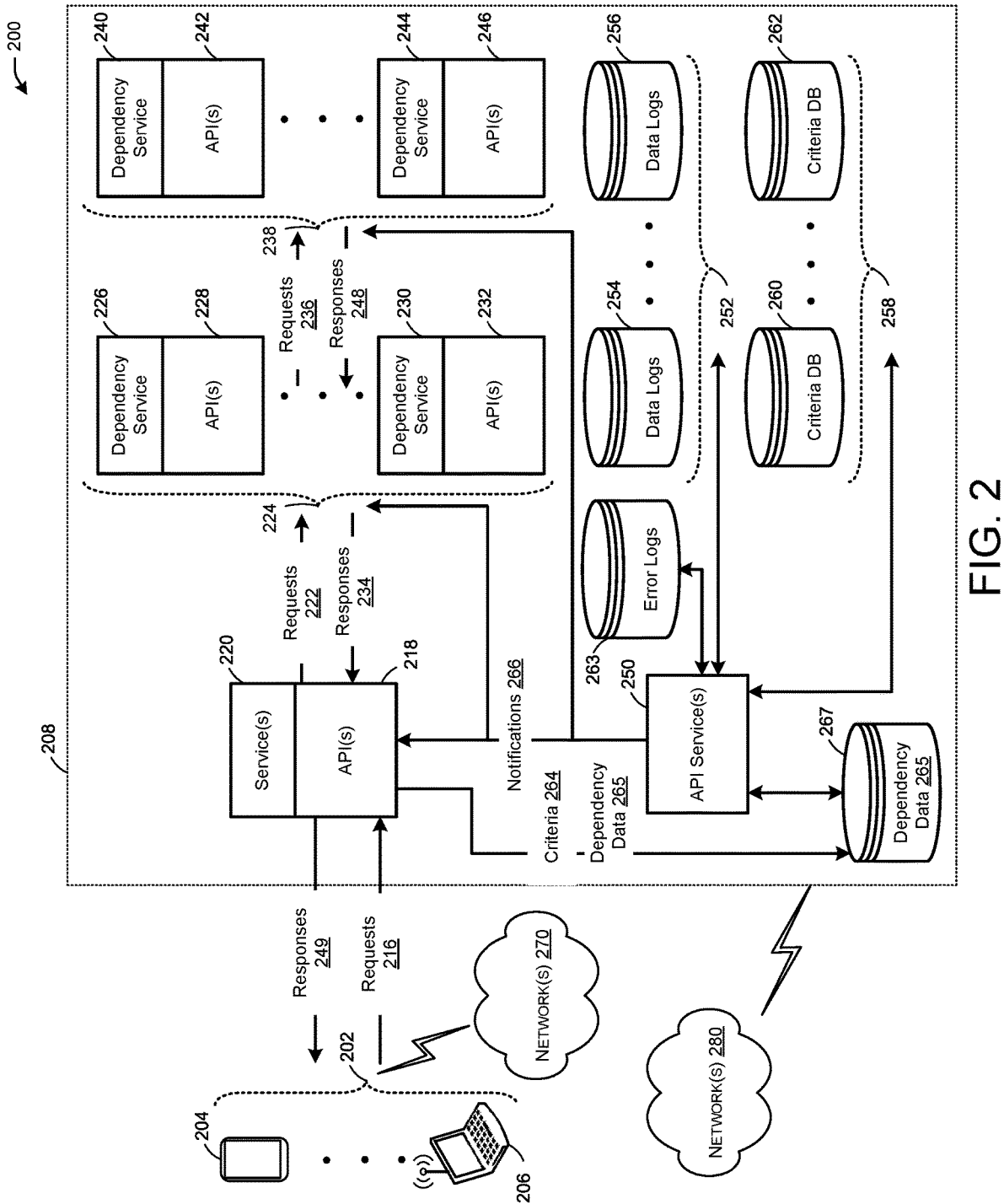
FIG. 2 illustrates a system for detecting and mitigating API anomalies, in accordance with one or more example embodiments of the present disclosure.

In one or more embodiments, because an SLA may define the dependency services of one or more computer services, the API service 106 may use the SLA to determine the dependencies (e.g., relationships) between multiple computer services. For example, the API service 106 may determine a dependency tree that indicates the one or more dependency services of one or more additional services. The API service 106 may monitor service logs (e.g., as shown in FIG. 2), identify errors and corruption based on the criteria defined by SLAs, may identify a responding service, and may use the dependency tree (or other mapping) to determine which, if any, dependency service may have caused the error or corruption. For example, the API service 106 may identify an error or corruption (e.g., that information in an API call does not satisfy criteria defined by an SLA), may identify the responder (e.g., the computer service that provided the non-compliant information), may determine one or more dependency services of the responder, and may use the logs of the responder to determine whether the error or corruption occurred based on another API call exchange with a dependency service. The API service 106 may search service logs of dependency services until the API service 106 identifies the source of the error or corruption based on which responding computer service provided the data that violated an SLA.

In one or more embodiments, the API service 106 may generate table entries (e.g., as explained further below with regard to FIG. 2) indicating errors and corruption detected, at what time, with which computer service(s), and the like. The API service 106 may detect SLA violations in real-time, and may notify API service owners (e.g., the computer services of the cloud-based network 104) that the API service owner issued a non-compliant response to an API call. The notification may identify the API call, the SLA, the SLA criteria not satisfied, and the like. The information provided in the notifications may allow an API service owner to rectify errors (e.g., by sending compliant information to requesting services, by notifying requesting services of the errors, etc.) in real-time to avoid subsequent errors or corruption caused by failures to comply with SLAs.

While it is shown in FIG. 1 that the computer service 1 depends on the computer service 2 and the computer service 3, any computer service may depend from another computer service. For example, the computer service 2 may call the computer service 3, and/or the computer service 3 may call the computer service 2. In this manner, the API service may compare multiple API calls from a computer service to identify the source of an API anomaly.

The device 102 and/or the cloud-based network 104 may include any suitable processor-driven device including, but not limited to, a mobile device or a non-mobile, e.g., a static, device. For example, the device 102 and/or the cloud-based network 104 may include a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile Internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc. may also be included in this list.

FIG. 2 illustrates a system 200 for detecting and mitigating API anomalies, in accordance with one or more example embodiments of the present disclosure.

Referring to FIG. 2, the system 200 may include one or more devices 202 (e.g., device 204, device 206, similar to the device 102 of FIG. 1) in communication with a cloud-based network 208 (e.g., similar to the cloud-based network 104 of FIG. 1). The one or more devices 202 may send requests 216 to one or more APIs 218 (e.g., API endpoints) of one or more services 220 (e.g., the computer service 1, the computer service 2, the computer service 3 of FIG. 1). The requests 216 may include configurable criteria, such as service level agreements (SLAs), such as in step 108 of FIG. 1. The requests 216 may include one or more API calls, such as in step 111 of FIG. 1). In responses to the requests 216, the one or more APIs 218 of the one or more services 220 may send requests 222 to one or more dependency services 224. For example, operation of the one or more services 220 may depend on operation of the one or more dependency services 224 (e.g., dependency service 226 having one or more APIs 228, dependency service 230 having one or more APIs 232), and the requests 222 may be sent to and received by the one or more APIs 228 and/or the one or more APIs 232. The requests 222 may request execution of and/or performance of one or more operations by the one or more dependency services 224. The one or more dependency services 224, in response to the requests 222, may send responses 234 to the one or more APIs 218. In response to the requests 222, the one or more dependency services 224 may send (e.g., using the one or more APIs 228 and/or the one or more APIs 232) requests 236 to one or more dependency services 238 (e.g., dependency service 240 having one or more APIs 242, dependency service 244 having one or more APIs 246), and the requests 236 may be sent to and received by the one or more APIs 242 and/or the one or more APIs 246. The requests 236 may request execution of and/or performance of one or more operations by the one or more dependency services 238. In response to the requests 236, the one or more dependency services 238 may send responses 248 (e.g., using the one or more APIs 242 and/or the one or more APIs 246) to the one or more dependency services 224, which may use the data in the responses 248 to generate and send the responses 234 to the one or more services 220. The one or more services 220 may depend on the one or more dependency services 224 and/or the one or more dependency services 238.

Still referring to FIG. 2, the cloud-based network 208 may include one or more API services 250, which may include an API anomaly detection service and an API anomaly messaging/notification service (e.g., which may be a same service or multiple services). In real-time, the one or more API services 250 may evaluate one or more data logs 252 (e.g., data logs 254, data logs 256), which may store data (e.g., API call log data) of one or multiple of the one or more services 220, the one or more dependency services 224, and/or the one or more dependency services 238. The one or more data logs 252 may identify API calls (e.g., requests, responses), the source and destination addresses of the API calls, the time of the API calls, and payloads of the API calls. To evaluate whether the payloads in the API calls of any service meets configurable criteria (e.g., configurable SLA criteria, such as in step 108 of FIG. 1), the one or more API services 250 may access one or more criteria databases (DBs) 258 (e.g., criteria DB 260, criteria DB 262). The one or more criteria DBs 258 receiving and storing criteria 264, which may be provided by the one or more devices 202 (e.g., step 108 of FIG. 1) to the one or more APIs 218. The criteria may define the data types, data ranges, data size, etc. of data to be included in API calls, and the criteria may be defined by agreements (e.g., SLAs) configured by the one or more devices 202. In this manner, the criteria for the one or more services 220 may govern the API call data for the one or more dependency services 224 and/or the one or more dependency services 238.

Still referring to FIG. 2, the one or more API services 250 may evaluate API call data stored in the one or more data logs 252 (e.g., as API call data is recorded in the one or more data logs 252 when API calls are sent and received). The evaluation may include comparing payloads of API calls to the criteria to determine whether the criteria is satisfied or not (e.g., did a character string in a payload meet a length threshold, data type, data range, or the like). For example, the one or more API services 250 may evaluate a data log of API call data sent from and received by the one or more services 220. When payloads of API calls sent from and received by the one or more services 220 do not meet a criteria set for the one or more services 220, the one or more API services 250 determine whether the one or more services depend on any dependency services. To identify service dependencies (e.g., step 122 of FIG. 1), the one or more API services 250 may retrieve dependency data 265 stored in a dependency DB 267. The dependency data 265 may be provided by an SLA or other agreement, for example, and therefore may be configurable by the one or more devices 202. The dependency data 265 may include a dependency mapping (e.g., a dependency tree) that defines the dependency relationship(s) of any computer-based service on any other computer-based service.

Still referring to FIG. 2, when the one or more API services 250 determines (e.g., using the dependency data 265) that the one or more services 220 depend on the one or more dependency services 224, the one or more API services 250 may evaluate API data of the one or more dependency services 224 (e.g., using the one or more data logs 252) to determine whether any API calls sent from or received by the one or more dependency services 224 violated the criteria 264 associated with the one or more services 220. When any service or dependency service API data satisfies the criteria 264, the one or more API services 250 may determine that the service or dependency service complied with the criteria 264. When any service or dependency service API data fails to satisfy (e.g., violates) the criteria 264, the one or more API services 250 may use the dependency data 265 to determine whether the violating service or dependency service further depends on any other dependency service (e.g., the one or more dependency services 238). In this manner, the one or more API services 250 may isolate the source of the criteria 264 violation by determining whether the originator of any API data depended on a dependency service that also violated the criteria 264. When a violating service has no dependency, or when the dependency services of a violating service did not violate the criteria 264, the violating service may be the source of the violation. Once a violation and the source (e.g., a service or dependency service) of the violation has been identified by the one or more API services 250, the one or more API services 250 may generate one or more table entries (e.g., in one or more error logs 263) indicating the violation (e.g., with an identifier), the service(s) involved in the violation, the timing of the violation, the originator or source of the violation, and the criteria violated. The one or more API services 250 may send one or more notifications 266 to any service involved in the error, including the originator or source, and the one or more notifications 266 may indicate that a violation occurred, the originator or source of the error, the specific API call where the error was detected, the time of the error, and the criteria 264. The recipient service of the or more notifications 266 may mitigate the error by resending a response to a requesting service, the response including a payload that satisfies the criteria 264 (else the one or more API services 250 may again detect the error and notify the source service of the error). The one or more APIs 218 that received the requests 216 may send responses 249 to the one or more devices 202, the responses 249 including requested information and/or confirmation that operations specified by the requests 216 were fulfilled/implemented. When the responses 249 result in errors due to a violation of the criteria 264, subsequent responses based on the one or more notifications 266 may rectify the violation by providing the correct data requested and/or confirming that the requests 216 were fulfilled/implemented. The responses 249 may include indications that an error occurred, and may indicate the criteria that was violated (e.g., the cause of the error). When the criteria 264 defined by an agreement is re-triable, the notifications 266 may indicate to a service to retry (e.g., repeat performance of) an operation to reproduce data that complies with the criteria 264.

In one or more embodiments, the one or more API services 250 may have access to (e.g., via the one or more criteria DBs 258) configurable SLAs. The SLAs may define configurable criteria (e.g., the criteria 264) for the one or more services 220, the one or more dependency services 224, and/or the one or more dependency services 238. The criteria 264 may define acceptable data types, data ranges, data sources used to respond to an API call, and the like. The one or more devices 202 may provide configurable SLAs (e.g., as payloads of the requests 216 or otherwise) to the cloud-based network 208, and the configurable SLAs may define dependency services and relationships between services (e.g., the dependency data 265), the criteria 264, and other relevant information used to determine service dependencies, criteria with which to detect API anomalies, and the like. A configurable SLA may define the criteria for a string of characters used in an API response (e.g., the responses 234, the responses 248, the responses 249), allowing the one or more API services 250 to determine (e.g., based on API data stored in the one or more data logs 252) whether a payload of an API response included a string of characters that complied with the criteria 264 defined by the SLA. When the criteria 264 is not satisfied, one or more API services 250 may send the notifications 266 to a computer service (e.g., to the service that was the source of the non-compliance). The criteria 264 may depend on a process or workflow (e.g., any process or workflow may rely on the operation of multiple services having dependencies that may depend on the process or workflow), may depend on a type of the requests 216 (e.g., representational state transfer, remote procedure call, simple object access protocol, http, etc.), the content (e.g., payload) of the requests 216, the range and/or size of the content of the requests, and the like. In this manner, the one or more API services 250 may evaluate the requests 216, determine the criteria 264 based on the requests 216, and evaluate the API data in the one or more data logs 252 to identify API anomalies.

In one or more embodiments, because an SLA may define the dependency services of the one or more computer services 220, the one or more API services 250 may use the SLA (e.g., the dependency data 265 of the SLA) to determine the dependencies (e.g., relationships) between multiple computer services. For example, the one or more API services 250 may determine a dependency tree that indicates that the one or more services 220 depend on the one or more dependency services 224, that the one or more dependency services 224 depend on the one or more dependency services 238, that the one or more dependency services 238 depend on one or more additional dependency services (not shown), and so on (e.g., there may be many layers of dependency services and many dependencies used in a given process or workflow). The one or more API services 250 may monitor the one or more data logs 252, identify errors and corruption based on the criteria 264 defined by SLAs, may identify a responding service, and may use the dependency data 265 to determine which, if any, dependency service may have caused the error or corruption. For example, the one or more API services 250 may identify an error or corruption (e.g., that information in an API call does not satisfy criteria defined by an SLA), may identify the responder (e.g., the computer service that provided the non-compliant information), may determine one or more dependency services of the responder, and may use the one or more data logs 252 of the responder to determine whether the error or corruption occurred based on another API call exchange with a dependency service. The one or more API services 250 may search the one or more data logs 252 of dependency services until the one or more API services 250 identifies the source of the error or corruption based on which responding computer service provided the data that violated an SLA.

In one or more embodiments, the one or more API services 250 may generate table entries in the one or more error logs 263, the table entries (or other types of data entries) indicating errors and corruption detected, at what time, with which computer service(s), and the like. The one or more API services 250 may detect SLA violations in real-time, and may notify API service owners (e.g., the one or more services 220, the one or more dependency services 224, the one or more dependency services 238) that the API service owner issued a non-compliant response to an API call. The notifications 266 may identify the API call, the SLA, the criteria 264 not satisfied, and the like. The information provided in the notifications 266 may allow an API service owner to rectify errors (e.g., by sending compliant information to requesting services, by notifying requesting services of the errors, etc.) in real-time to avoid subsequent errors or corruption caused by failures to comply with SLAs.

The one or more devices 202 may be configured to communicate via a communications network 270, and/or the cloud-based network 208 may be configured to communicate via a communications network 280, wirelessly or wired (e.g., the same or different wireless communications networks). The communications network 270 and/or the communications network 280 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 270 and/or the communications network 280 may have any suitable communication range associated therewith and may include, for example, global networks (e.g., the Internet), metropolitan area networks (MANs), wide area networks (WANs), local area networks (LANs), or personal area networks (PANs). In addition, communications network 270 and/or the communications network 280 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The one or more devices 202 and/or the cloud-based network 208 may include any suitable processor-driven device including, but not limited to, a mobile device or a non-mobile, e.g., a static, device. For example, one or more devices 202 and/or the cloud-based network 208 may include a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc. may also be included in this list.

Figure 3:
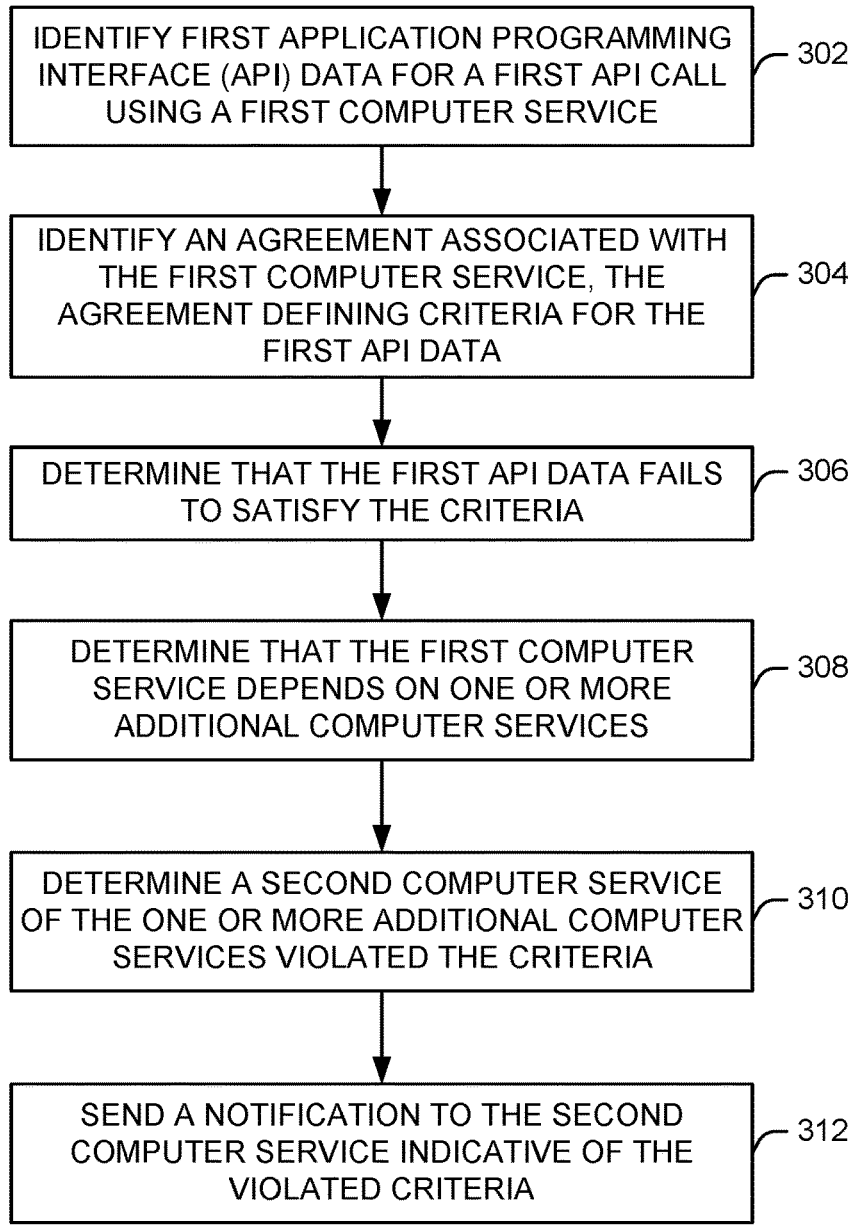
FIG. 3 illustrates a flow diagram for a process for detecting and mitigating API anomalies, in accordance with one or more example embodiments of the present disclosure.

FIG. 3 illustrates a flow diagram for a process 300 for detecting and mitigating API anomalies, in accordance with one or more example embodiments of the present disclosure.

At block 302, a device (or system, e.g., the cloud-based network 104 of FIG. 1, the cloud-based network 208 of FIG. 2) may identify first API data for a first call using a first computer service (e.g., the computer service 1 of FIG. 1, the one or more services 220 of FIG. 2). For example, the first API data may indicate that another device (e.g., the device 102 of FIG. 1, the one or more devices 202 of FIG. 2) may have sent a request (e.g., step 111 of FIG. 1, the requests 216 of FIG. 2) to the device. The device may have responded to the request, and the request may have indicated an error (e.g., a 5xx response, an HTTP resource not found response, a library exception, etc.) or may have included corrupt data. The device may retrieve the first API data (e.g., from the one or more data logs 252 of FIG. 2) and identify payloads of API calls to and from the first computer service.

At block 304, the device may identify an agreement (e.g., SLA) associated with the first computer service. For example, the agreement may be a configurable agreement provided by the other device, and may include (e.g., as configurable information in the agreement) criteria (e.g., the criteria 264 of FIG. 2) for evaluating the first API data for anomalies, and dependency data (e.g., the dependency data 265 of FIG. 2) indicating that the first computer service depends on one or more dependency services (e.g., the computer service 2 of FIG. 1, the computer service 3 of FIG. 1, the one or more dependency services 224 of FIG. 2, the one or more dependency services 238 of FIG. 2). The device may evaluate the first API data for API anomalies by comparing the payloads of API calls to and from the first computer service with the criteria in the agreement. When the first API data satisfies the criteria, the device may determine that the first API data does not include errors or corrupt data. When the first API data fails to satisfy any criteria, the device may evaluate the first API data further to determine whether the first computer service is the source of the error or data corruption, or whether a dependency service of the first computer service is the source of the error or data corruption.

At block 306, the device may determine that the first API data fails to satisfy some criteria of the agreement. The satisfying of the criteria may be determined by comparing payloads of API calls to and from the first computer service to the criteria. For example, when the data sent from the first computer service to the other device in a response to a request received from the other device does not satisfy the criteria, the device may evaluate the first API data further to determine whether the first computer service is the source of the error or data corruption, or whether a dependency service of the first computer service is the source of the error or data corruption. The device may compare the data included in the response (e.g., the responses 249 of FIG. 2) from the first computer service to the criteria. For example, the data in the response may be evaluated for a data type, a data range, a data length, and the like (e.g., any of which may be predefined or based on the type of request to which the response is issued). When the criteria defines the expected or acceptable type of data in the response, the size of the data in the response, the service used in the response, or other criteria, the device may evaluate the first API data to determine whether the data included in the response meets all of the criteria. When any criteria is not met, the device may determine that the first API data fails to satisfy some criteria of the agreement.

At block 308, the device may determine that the first computer service depends on one or more additional services (e.g., dependency services). The device may have access to dependency data (e.g., the dependency data 265), which may be in the form of a dependency tree or other mapping of computer service dependencies. The dependency data may be provided by the agreement, by another agreement, or otherwise, or may be determined automatically by the device based on previous use of the first computer service, configuration data, or the like. The dependency may be based on the service, and/or further based on the type of request(s)/response(s) represented by the first API data, the type of process or workflow initiated by the request(s)/response(s) represented by the first API data, the type of device of the other device that provided the request, a geographic region/location, a time of day or week, the load experienced by any service or dependency service (e.g., using load balancing techniques), and the like. When the first computer service has no (e.g., lacks) dependency services (e.g., does not depend on operation of another service), then the device may determine that the first computer service is the source of the error or data corruption (e.g., the violation of the criteria). When the dependency data indicates that the computer service depends on one or more additional services, the device may retrieve API data of requests to and responses from the one or more additional services.

At block 310, the device may determine that a second computer service (e.g., of the one or more additional services) violated the criteria and is the source of the error or data corruption. The device may evaluate API data of calls to and from the second service and any other dependency services of the first computer service, and may compare the API data to the criteria of the agreement used to govern the first computer service. When no API data of dependency services violates the criteria, the device may determine that the service that depends on the dependency services is the source of the violation. When some API data of a dependency service violates the criteria, the device may further investigate by determining whether the dependency service (e.g., the second computer service) depends on any other services (e.g., using the dependency data as described above). When the second computer service depends on any other service, the device may determine whether any API data from the other service violates the criteria. When no API data of a dependency service of the second computer service violates the criteria, the device may determine that the second computer service is the source of the violation.

At block 312, the device may send a notification (e.g., the notifications 266 of FIG. 2) to the second computer service. The device may generate a table entry indicating the violation (e.g., a violation identifier), the criteria violated, the agreement providing the criteria, the services involved in the violation, the API data that violated the criteria, the source and destination information of the API data, the time of day, and the like. The notification may include the same information and/or may include an identifier of the violation (e.g., the table entry) to allow the second computer service to identify and mitigate the violation.

Figure 4:
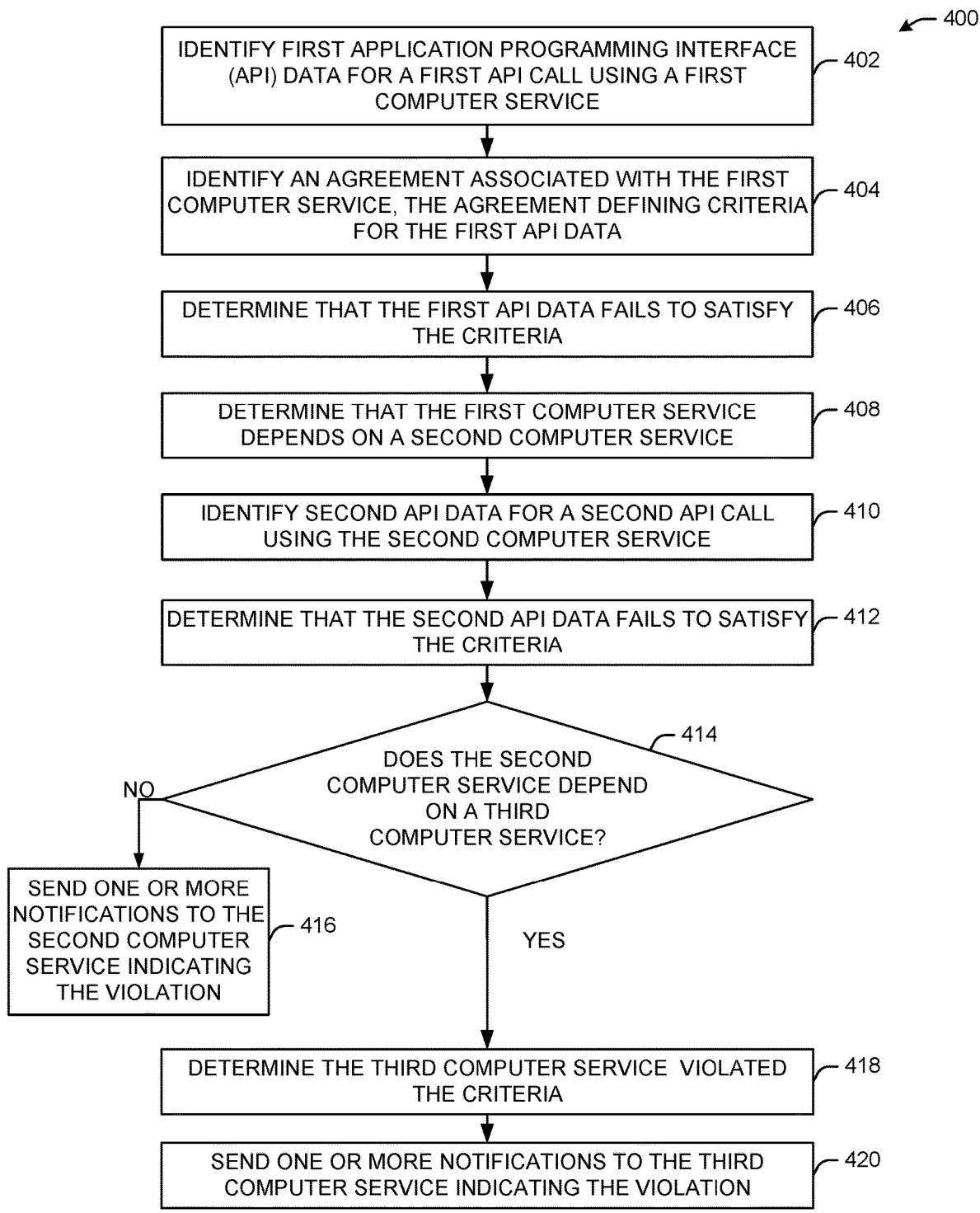
FIG. 4 illustrates a flow diagram for a process for detecting and mitigating API anomalies, in accordance with one or more example embodiments of the present disclosure.

FIG. 4 illustrates a flow diagram for a process 400 for detecting and mitigating API anomalies, in accordance with one or more example embodiments of the present disclosure.

At block 402, a device (or system, e.g., the cloud-based network 104 of FIG. 1, the cloud-based network 208 of FIG. 2) may identify first API data for a first call using a first computer service (e.g., the computer service 1 of FIG. 1, the one or more services 220 of FIG. 2). For example, the first API data may indicate that another device (e.g., the device 102 of FIG. 1, the one or more devices 202 of FIG. 2) may have sent a request (e.g., step 111 of FIG. 1, the requests 216 of FIG. 2) to the device. The device may have responded to the request, and the request may have indicated an error (e.g., a 5xx response, an HTTP resource not found response, a library exception, etc.) or may have included corrupt data. The device may retrieve the first API data (e.g., from the one or more data logs 252 of FIG. 2) and identify payloads of API calls to and from the first computer service.

At block 404, the device may identify an agreement (e.g., SLA) associated with the first computer service. For example, the agreement may be a configurable agreement provided by the other device, and may include (e.g., as configurable information in the agreement) criteria (e.g., the criteria 264 of FIG. 2) for evaluating the first API data for anomalies, and dependency data (e.g., the dependency data 265 of FIG. 2) indicating that the first computer service depends on one or more dependency services (e.g., the computer service 2 of FIG. 1, the computer service 3 of FIG. 1, the one or more dependency services 224 of FIG. 2, the one or more dependency services 238 of FIG. 2). The device may evaluate the first API data for API anomalies by comparing the payloads of API calls to and from the first computer service with the criteria in the agreement. When the first API data satisfies the criteria, the device may determine that the first API data does not include errors or corrupt data. When the first API data fails to satisfy any criteria, the device may evaluate the first API data further to determine whether the first computer service is the source of the error or data corruption, or whether a dependency service of the first computer service is the source of the error or data corruption.

At block 406, the device may determine that the first API data fails to satisfy some criteria of the agreement. The satisfying of the criteria may be determined by comparing payloads of API calls to and from the first computer service to the criteria. For example, when the data sent from the first computer service to the other device in a response to a request received from the other device does not satisfy the criteria, the device may evaluate the first API data further to determine whether the first computer service is the source of the error or data corruption, or whether a dependency service of the first computer service is the source of the error or data corruption. The device may compare the data included in the response (e.g., the responses 249 of FIG. 2) from the first computer service to the criteria. For example, the data in the response may be evaluated for a data type, a data range, a data length, and the like (e.g., any of which may be predefined or based on the type of request to which the response is issued). When the criteria defines the expected or acceptable type of data in the response, the size of the data in the response, the service used in the response, or other criteria, the device may evaluate the first API data to determine whether the data included in the response meets all of the criteria. When any criteria is not met, the device may determine that the first API data fails to satisfy some criteria of the agreement.

At block 408, the device may determine that the first computer service depends on one or more additional services (e.g., dependency services). The device may have access to dependency data (e.g., the dependency data 265), which may be in the form of a dependency tree or other mapping of computer service dependencies. The dependency data may be provided by the agreement, by another agreement, or otherwise, or may be determined automatically by the device based on previous use of the first computer service, configuration data, or the like. The dependency may be based on the service, and/or further based on the type of request(s)/response(s) represented by the first API data, the type of process or workflow initiated by the request(s)/response(s) represented by the first API data, the type of device of the other device that provided the request, a geographic region/location, a time of day or week, the load experienced by any service or dependency service (e.g., using load balancing techniques), and the like. When the first computer service has no (e.g., lacks) dependency services (e.g., does not depend on operation of another service), then the device may determine that the first computer service is the source of the error or data corruption (e.g., the violation of the criteria). When the dependency data indicates that the computer service depends on one or more additional services, the device may retrieve API data of requests to and responses from the one or more additional services.

At block 410, the device may identify second API data for a second call using a second computer service (e.g., the computer service 2 of FIG. 1, the one or more dependency services 224 of FIG. 2). For example, the second API data may indicate that the first computer service may have sent a request (e.g., step 112 of FIG. 1, the requests 236 of FIG. 2) to the second computer service. The second computer service may have responded to the request. The device may retrieve the second API data (e.g., from the one or more data logs 252 of FIG. 2) and identify payloads of API calls to and from the second computer service.

At block 412, the device may determine that the second API data fails to satisfy criteria of the agreement. The satisfying of the criteria may be determined by comparing payloads of API calls to and from the second computer service to the criteria. For example, when the data sent from the second computer service to the first computer service in a response to a request received from the first computer service does not satisfy the criteria, the device may evaluate the second API data further to determine whether the second computer service is the source of the error or data corruption, or whether a dependency service of the second computer service is the source of the error or data corruption. The device may compare the data included in the response (e.g., the responses 248 of FIG. 2) from the second computer service to the criteria. For example, the data in the response may be evaluated for a data type, a data range, a data length, and the like (e.g., any of which may be predefined or based on the type of request to which the response is issued). When the criteria defines the expected or acceptable type of data in the response, the size of the data in the response, the service used in the response, or other criteria, the device may evaluate the second API data to determine whether the data included in the response meets all of the criteria. When any criteria is not met, the device may determine that the second API data fails to satisfy some criteria of the agreement.

At block 414, the device may determine whether the second computer service depends on any other computer services (e.g., a third computer service). For example, the device may rely on the dependency data described above to determine whether the second computer services relies on any dependency services. When the second computer service does not depend on any other service, the device may continue to block 416. When the second computer service depends on a third computer service, the device may continue to block 418.

At block 416, the device may send a notification (e.g., the notifications 266 of FIG. 2) to the second computer service. The device may generate a table entry indicating the violation (e.g., a violation identifier), the criteria violated, the agreement providing the criteria, the services involved in the violation, the API data that violated the criteria, the source and destination information of the API data, the time of day, and the like. The notification may include the same information and/or may include an identifier of the violation (e.g., the table entry) to allow the second computer service to identify and mitigate the violation.

At block 418, the device may determine that the third computer service violated the criteria and is the source of the error or data corruption. The device may evaluate API data of calls to and from the third computer service and any other dependency services of the second computer service, and may compare the API data to the criteria of the agreement used to govern the first computer service. When no API data of dependency services violates the criteria, the device may determine that the service that depends on the dependency services is the source of the violation. When some API data of a dependency service violates the criteria, the device may further investigate by determining whether the dependency service (e.g., the second computer service) depends on any other services (e.g., using the dependency data as described above). When the third computer service depends on any other service, the device may determine whether any API data from the other service violates the criteria. When no API data of a dependency service of the third computer service violates the criteria, the device may determine that the third computer service is the source of the violation.

At block 420, the device may send a notification (e.g., the notifications 266 of FIG. 2) to the third computer service. The device may generate a table entry indicating the violation (e.g., a violation identifier), the criteria violated, the agreement providing the criteria, the services involved in the violation, the API data that violated the criteria, the source and destination information of the API data, the time of day, and the like. The notification may include the same information and/or may include an identifier of the violation (e.g., the table entry) to allow the third computer service to identify and mitigate the violation.

Figure 5:
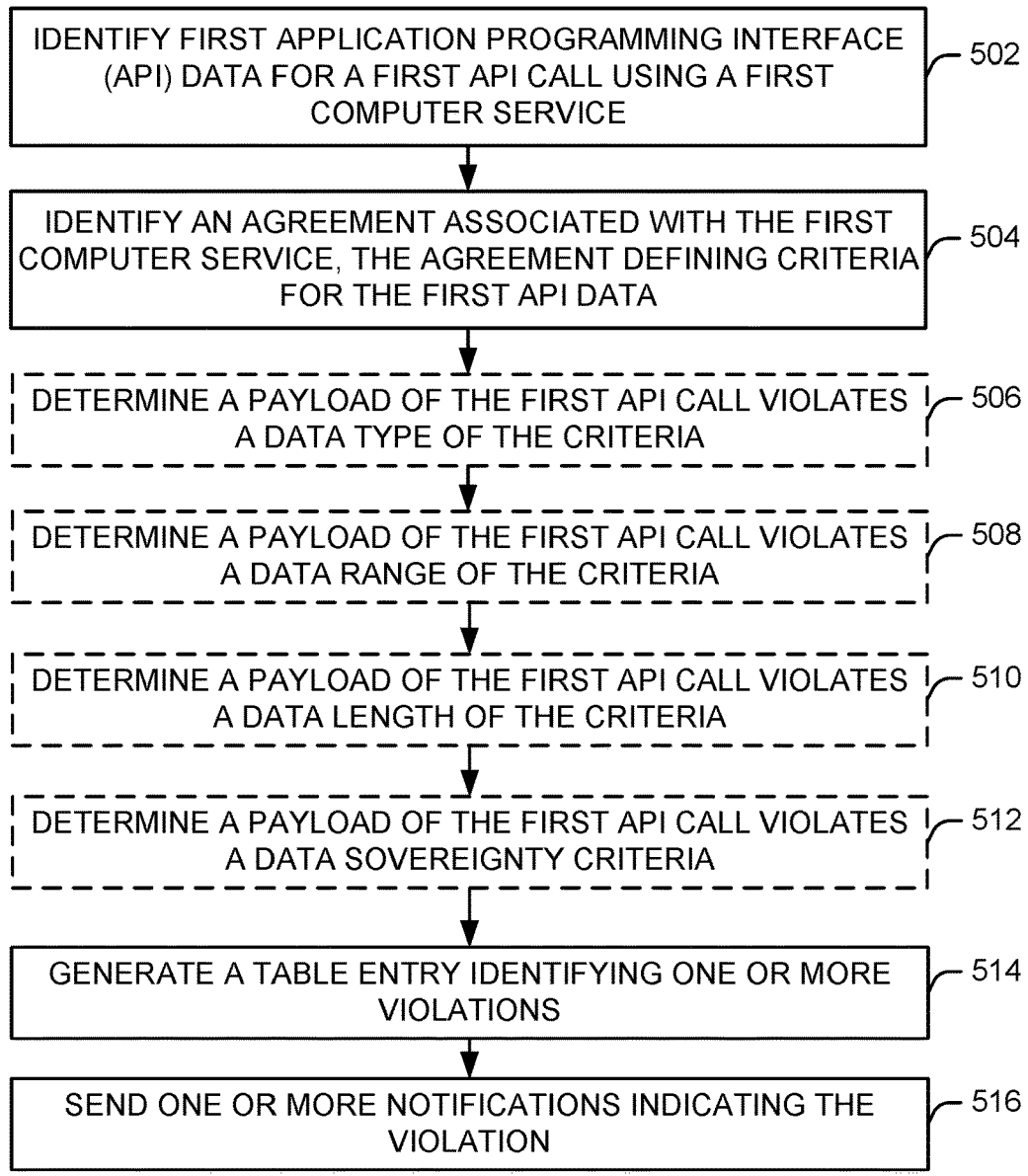
FIG. 5 illustrates a flow diagram for a process for detecting and mitigating API anomalies, in accordance with one or more example embodiments of the present disclosure.

FIG. 5 illustrates a flow diagram for a process 500 for detecting and mitigating API anomalies, in accordance with one or more example embodiments of the present disclosure.

At block 502, a device (or system, e.g., the cloud-based network 104 of FIG. 1, the cloud-based network 208 of FIG. 2) may identify first API data for a first call using a first computer service (e.g., the computer service 1 of FIG. 1, the one or more services 220 of FIG. 2). For example, the first API data may indicate that another device (e.g., the device 102 of FIG. 1, the one or more devices 202 of FIG. 2) may have sent a request (e.g., step 111 of FIG. 1, the requests 216 of FIG. 2) to the device. The device may have responded to the request, and the request may have indicated an error (e.g., a 5xx response, an HTTP resource not found response, a library exception, etc.) or may have included corrupt data. The device may retrieve the first API data (e.g., from the one or more data logs 252 of FIG. 2) and identify payloads of API calls to and from the first computer service.

At block 504, the device may identify an agreement (e.g., SLA) associated with the first computer service. For example, the agreement may be a configurable agreement provided by the other device, and may include (e.g., as configurable information in the agreement) criteria (e.g., the criteria 264 of FIG. 2) for evaluating the first API data for anomalies, and dependency data (e.g., the dependency data 265 of FIG. 2) indicating that the first computer service depends on one or more dependency services (e.g., the computer service 2 of FIG. 1, the computer service 3 of FIG. 1, the one or more dependency services 224 of FIG. 2, the one or more dependency services 238 of FIG. 2). The device may evaluate the first API data for API anomalies by comparing the payloads of API calls to and from the first computer service with the criteria in the agreement. When the first API data satisfies the criteria, the device may determine that the first API data does not include errors or corrupt data. When the first API data fails to satisfy any criteria, the device may evaluate the first API data further to determine whether the first computer service is the source of the error or data corruption, or whether a dependency service of the first computer service is the source of the error or data corruption.

At block 506, block 508, block 510, and/or block 512 the device may compare the first API data (e.g., the payload of the first API call) to the criteria. At block 506, the criteria optionally may include a data type. For example, when the first API call is a response to a request, the data type may be based on the type of request (e.g., representational state transfer, remote procedure call, simple object access protocol, http, etc.). The data type may refer to the data protocol used, the content of the data (e.g., any combination of letters, numbers, special characters, etc.) in the first API call payload, the nature of the data in the first API call payload (e.g., objects, personal data, etc.), and the like. When the first API data violates the data type of the criteria by using the wrong protocol, providing characters not permitted by the criteria, and/or providing unexpected types of data, the device may note the violation in a table entry. At block 508, the criteria optionally may include a data range. For example, the data in the payload of the first API call may be required by the criteria to be within a range (e.g., based on a range of numbers and/or letters). When the first API data violates the data range, the device may note the violation in a table entry. At block 510, the criteria optionally may include a data length. For example, the length or size of the payload of the first API call may be restricted and/or may have a minimum length or size given the specific type of request, the service responding to the request, the load experienced by any service, the time of day, or the like. When the length and/or size of the payload of the first API call fails to satisfy a respective length and/or size threshold or range, the device may note the violation in a table entry. Other criteria may be used to detect API anomalies. At block 512, the criteria may define data sovereignty and/or data providence criteria. When data does not originate from a proper location and/or service, or does not comply with a data sovereignty rule, the data may result in an anomaly (e.g., violation).

At block 514, the device may generate one or more table entries identifying any criteria violations (e.g., anomalies). The device may generate a table entry indicating the violation (e.g., a violation identifier), the criteria violated, the agreement providing the criteria, the services involved in the violation, the API data that violated the criteria, the source and destination information of the API data, the time of day, and the like.

At block 516, the device may send notifications (e.g., the notifications 266 of FIG. 2) to any services involved in the anomalies. A notification may include the table information and/or may include an identifier of the violation (e.g., the table entry) to allow any computer service to identify and mitigate the violation.

These examples are not meant to be limiting.

Figure 6:
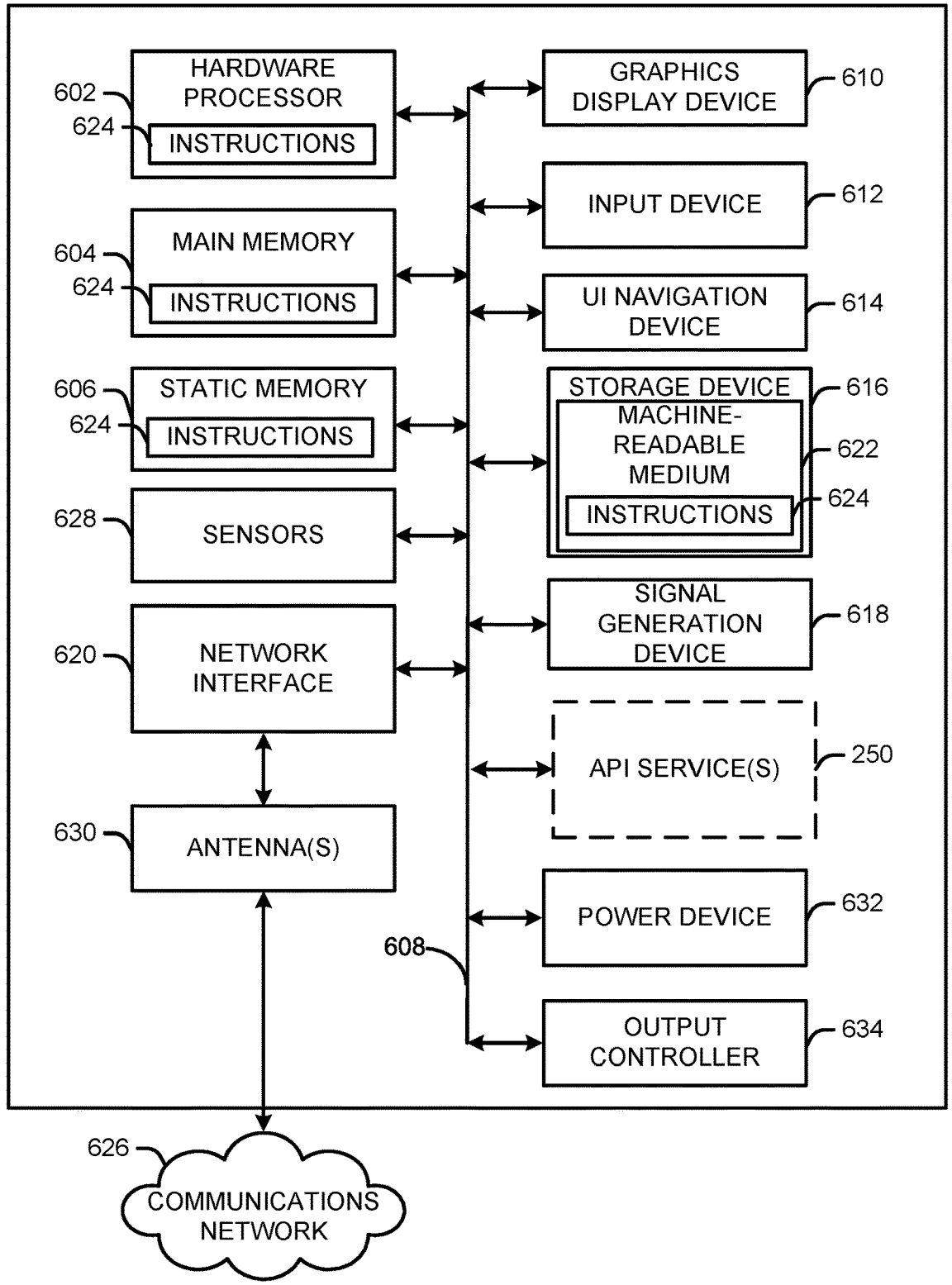
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 or system (e.g., the device 102 of FIG. 1, the cloud-based network 104 of FIG. 1, the one or more devices 202 of FIG. 2, the cloud-based network 208 of FIG. 2) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, the one or more API services 250 of FIG. 2 (e.g., one or more modules capable of performing the process 300 of FIG. 3, the process 400 of FIG. 4, and/or the process 500 of FIG. 5), a network interface device/transceiver 620 coupled to antenna(s) 630, and one or more sensors 628, such as a global positioning system (GPS) sensor, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
   identifying, by at least one processor of a device and based on a first data log, first application programming interface (API) data associated with a first API call between a first computer service and a second computer service, operation of the first computer service depending on operation of the second computer service;
   identifying, by the at least one processor, a service level agreement (SLA) associated with the first computer service, wherein the SLA comprises criteria selected for the first computer service;
   determining, by the at least one processor, that the first API data fails to satisfy the criteria;
   determining, by the at least one processor, that operation of the second computer service depends on operation of a third computer service and operation of a fourth computer service;
   identifying, by the at least one processor and based on a second data log, second API data associated with a second API call between the second computer service and the third computer service;
   determining, by the at least one processor, that the second API data satisfies the criteria;
   identifying, by the at least one processor and based on the second data log, third API data associated with a third API call between the second computer service and the fourth computer service;
   determining, by the at least one processor, that the third API data fails to satisfy the criteria; and
   sending, by the at least one processor, one or more notifications to the fourth computer service, the one or more notifications indicative of the third API data and the criteria.

2. The method of claim 1, further comprising:
   identifying fourth API data associated with a fourth API call between the first computer service and the second computer service;
   determining that the fourth API data fails to satisfy the criteria;
   identifying fifth API data associated with a fifth API call between the second computer service and the third computer service;
   determining that the fifth API data satisfies the criteria;
   identifying sixth API data associated with a sixth API call between the second computer service and the fourth computer service;
   determining that the sixth API data satisfies the criteria; and
   sending one or more second notifications to the second computer service, the one or more second notifications indicative of the fourth API data and the criteria.

3. The method of claim 1, further comprising determining that the fourth computer service lacks a dependency service, wherein sending the one or more notifications to the fourth computer service is based on the determination that the fourth computer service computer lacks a dependency service.

4. The method of claim 1, wherein the criteria comprises a data range, further comprising:
   determining that a payload of the first API call comprises a data string; and determining that the data string fails to satisfy the data range, wherein determining that the first API data fails to satisfy the criteria is based on the data string and the data range.

5. A method, comprising:
identifying, by at least one processor of a device and based on a first data log, first application programming interface (API) data associated with a first API call between a first computer service and a second computer service;
identifying, by the at least one processor, an agreement associated with the first computer service, wherein the agreement comprises criteria associated with the first API data;
determining, by the at least one processor, that the first API data fails to satisfy the criteria;
determining, by the at least one processor, one or more service dependencies, the one or more service dependencies indicating that operation of the first computer service depends on operation of the second computer service;
determining, by the at least one processor and based on the one or more service dependencies, that the second computer service or a third computer service caused the failure of the first API data to satisfy the criteria; and
sending, by the at least one processor, one or more notifications to the second computer service or the third computer service.

6. The method of claim 5, further comprising determining, based on the one or more service dependencies, that the second computer service lacks a dependency service, wherein the one or more notifications are sent to the second computer service.

7. The method of claim 5, further comprising:
determining, based on the one or more service dependencies, that operation of the second computer service depends on operation of the third computer service;
identifying, based on a second data log, second API data associated with a second API call between the second computer service and the third computer service; and
determining that the second API data satisfies the criteria, wherein the one or more notifications are sent to the second computer service.

8. The method of claim 5, further comprising:
determining, based on the one or more service dependencies, that operation of the second computer service depends on operation of the third computer service and operation of a fourth computer service;
identifying, based on a second data log, second API data associated with a second API call between the second computer service and the third computer service; and
determining that the second API data satisfies the criteria;
identifying, based on the second data log, third API data associated with a third API call between the second computer service and the fourth computer service; and
determining that the third API data fails to satisfy the criteria, wherein the one or more notifications are sent to the fourth computer service.

9. The method of claim 8, wherein the first API call is associated with the second API call and the third API call.

10. The method of claim 5, wherein determining the one or more service dependencies comprises determining, based on a data source, a service dependency tree indicative of the one or more service dependencies, further comprising determining, based on the service dependency tree, that operation of the first computer service depends on operation of the second computer service, and wherein the data source is different than the first data log.

11. The method of claim 5, wherein the one or more notifications comprise an identifier associated with an error, the error based on the first API data failing to satisfy the criteria.

12. The method of claim 11, further comprising generating a table entry comprising the identifier and the criteria.

13. The method of claim 5, wherein the agreement comprises criteria selected for the first computer service.

14. The method of claim 13, wherein the criteria comprises at least one of a data type, a data range, a data sovereignty, or a data providence.

15. The method of claim 14, further comprising:
determining that a payload of the first API call comprises a data string; and
determining that the data string fails to satisfy at least one of the data range or the data type, wherein determining that the first API data fails to satisfy the criteria is based on the data string and at least one of the data range or the data type.

16. A system comprising memory and at least one processor, the at least one processor configured to:
identify, based on a first data log, first application programming interface (API) data associated with a first API call between a first computer service and a second computer service;
identify an agreement associated with the first computer service, wherein the agreement comprises criteria associated with the first API data;
determine that the first API data fails to satisfy the criteria;
determine one or more service dependencies, the one or more service dependencies indicating that operation of the first computer service depends on operation of the second computer service;
determine, based on the one or more service dependencies, that the second computer service or a third computer service caused the failure of the first API data to satisfy the criteria; and
send one or more notifications to the second computer service or the third computer service.

17. The system of claim 16, the at least one processor further configured to determine, based on the one or more service dependencies, that the second computer service lacks a dependency service, wherein the one or more notifications are sent to the second computer service.

18. The system of claim 16, the at least one processor further configured to:
determine, based on the one or more service dependencies, that operation of the second computer service depends on operation of the third computer service;
identify, based on a second data log, second API data associated with a second API call between the second computer service and the third computer service; and
determine that the second API data satisfies the criteria, wherein the one or more notifications are sent to the second computer service.

19. The system of claim 16, the at least one processor further configured to:
determine, based on the one or more service dependencies, that operation of the second computer service depends on operation of the third computer service and operation of a fourth computer service;
identify, based on a second data log, second API data associated with a second API call between the second computer service and the third computer service; and
determine that the second API data satisfies the criteria;

identify, based on the second data log, third API data associated with a third API call between the second computer service and the fourth computer service; and determine that the third API data fails to satisfy the criteria, wherein the one or more notifications are sent to the fourth computer service.

20. The system of claim 16, wherein to determine the one or more service dependencies comprises to determine, based on a data source, a service dependency tree indicative of the one or more service dependencies, the at least one processor further configured to determine, based on the service dependency tree, that operation of the first computer service depends on operation of the second computer service, and wherein the data source is different than the first data log.

* * * * *